(12) United States Patent
Dunham

(10) Patent No.: US 11,557,415 B1
(45) Date of Patent: Jan. 17, 2023

(54) METHOD FOR AN INTERNAL LINEAR POLARITY SWITCHING PROPULSION SYSTEM

(71) Applicant: Mark London Dunham, Fairbanks, AK (US)

(72) Inventor: Mark London Dunham, Fairbanks, AK (US)

( * ) Notice: Subject to any disclaimer, the term of this patent is extended or adjusted under 35 U.S.C. 154(b) by 0 days.

(21) Appl. No.: 17/550,087

(22) Filed: Dec. 14, 2021

(51) Int. Cl.
  *H01F 7/02* (2006.01)
  *B60L 13/04* (2006.01)

(52) U.S. Cl.
  CPC ............ *H01F 7/0236* (2013.01); *B60L 13/04* (2013.01); *H01F 7/0257* (2013.01); *B60L 2200/26* (2013.01)

(58) Field of Classification Search
  CPC .... B60L 13/04; B60L 2200/26; H01F 7/0236; H01F 7/0257
  See application file for complete search history.

(56) References Cited

U.S. PATENT DOCUMENTS

| | | | | |
|---|---|---|---|---|
| 2006/0214756 A1* | 9/2006 | Elliott | ................... | H02N 15/00 335/306 |
| 2008/0083346 A1* | 4/2008 | Fiske | ................... | B60L 13/003 104/283 |
| 2017/0120401 A1* | 5/2017 | Fullerton | .............. | F16K 31/088 |
| 2018/0223481 A1* | 8/2018 | Dunham | ................ | B61B 13/08 |

FOREIGN PATENT DOCUMENTS

WO    WO-03095282 A2 * 11/2003 ............. B60L 13/04

* cited by examiner

*Primary Examiner* — Mohamad A Musleh
(74) *Attorney, Agent, or Firm* — Christopher Mayle; Bold IP, PLLC

(57) ABSTRACT

An improved magnetic propulsion system with a Linear Polarity Switching (LPS) series having a plurality of magnets that are magnetically and polarity orientated structurally and arranged to form forces of magnetic fields and polarity orientations of antithetical flux actions at one end that attract and repel at the other end against London Spinal Assemblage (LSA) configurations having a plurality of magnets that are magnetically and polarity orientated structurally and arranged to form forces of magnetic fields and polarity orientations of flux that attracts and repels the connections to enable a train or a load as a retrofit, along the XZ-plane of the fixed LPS series to have initial momentum at rest, continuous object acceleration or deceleration, and braking.

18 Claims, 10 Drawing Sheets

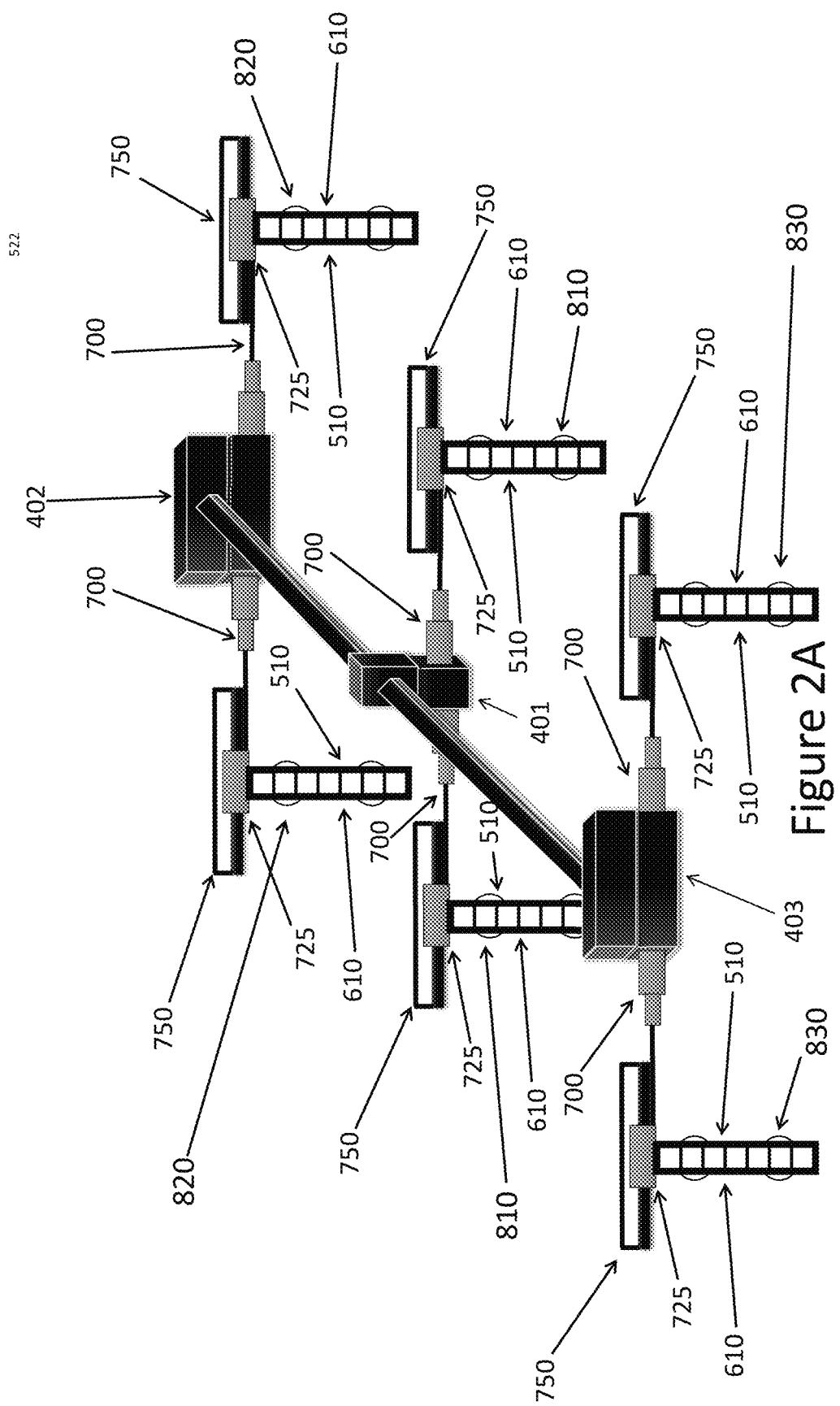

METHOD FOR AN INTERNAL LINEAR POLARITY SWITCHING PROPULSION SYSTEM

FIELD OF DISCLOSURE

The overall invention is directed to a system and method for a propulsion system and more particularly to a propulsion system having a magnet configuration that enables loads along the XZ-plane for initial momentum at rest, continuous object acceleration or deceleration, and braking.

BACKGROUND

Propulsion systems for magnetic levitation (maglev) trains usually consist of one or more of the following components: superconducting magnet coils, Linear Synchronous Motors or Linear Switching Motors (LSM) or Linear Induction Motors (LIM). To pull the train or load forward, one or more of these components can be used to produce an attraction action onto the train's front-end magnetic field component and simultaneously onto the train's back-end to attain a repulsive action. Each system can control the alternating currents to produce the switching actions of the of attract and repel to the environment at a quick and calculated rate at wavelets to cause forward momentum for the train at a continual pace.

Because the loads typically operate at top speeds ranging in hundreds of kilometers per hour, its circuitry must operate the polarity switching mechanism with high precision at each anticipated approaching wavelet when alternating polarity from one orientation to the other. Thus exists the need for a new propulsions system.

SUMMARY

It is an object of the present invention to provide the same external switching mechanism actions of attract and repel demonstrated in the electromagnetic systems for propulsion, by solely using the internal encountering properties of magnetic fields and polarity orientations found in permanent magnets. The permanent magnets encountering consists of two independent magnet arrangements, the first being the Linear Polarity Switching (LPS) series, which emanates magnetic fields and a dominant independent polarity orientation from either of its antithetical ends; and the second being the London Spinal Assemblage (LSA) configurations, which emanates an isolated primary polarity orientation along the XZ-plane and YZ-plane.

The force needed to achieve the internal switching actions of attract and repel occurs when the LSA configuration is in close proximity of the LPS series. It is solely an internal action initiated within the confines of the permanent magnets. The first set of forces of magnetic fields and polarity orientation emanate from the LSA configurations and are of the primary polarity orientation. The second set of magnetic fields and polarity orientations emanate from the LPS series and emanate a primary orientation from one of its antithetical ends and an inverse polarity orientation from its other antithetical end.

It is an object of the present invention to provide a propulsion system where the force required to achieve momentum and continuous acceleration, deceleration and braking onto a train or any load as a retrofit; is drawn from a first set of forces of magnetic fields and polarity orientations called the LSA configuration against a second set of magnetic fields and polarity orientations called the LPS series. The LSA's are mounted onboard a train or any load as a retrofit and the LPS series are fixed to produce a track formation.

The LPS series includes several individual permanent magnets in connection at their points of attraction which produce antithetical actions of forces of magnetic fields and an isolated dominant primary or dominant inverse polarity orientation at its respective end. Both dominant polarity orientations at each antithetical end of their respective central force system approaches the other ends central force system where they reach a midpoint where neither polarity orientation dominates. At this point of their encounter, each dominant polarity orientation translates from being a dominant polarity orientation to a status of being a minor polarity orientation. The midpoint where the dominant polarity orientation translates from dominancy to minor is called the Translation Zone (TZ).

As both dominant polarity orientation ends translate toward the others dominant end, they reach a point of equivalent polarity orientation dominancy. The magnetic fields and polarity orientation of the permanent magnets in connection between the independent dominant polarity orientations have a continuing toggling action of both independent dominant polarity orientations. Both independent dominant polarity orientation translations toggle polarity orientation dominancy back and forth until they reach a point between them of equal dominancy at TZ. The encounter of the LPS series force of magnetic fields and dominant polarity orientations against the LSA configurations magnetic fields and polarity orientations trigger a real time internal polarity orientation switching within the confines of the LPS series. The LPS series' internal polarity switching results in momentum and thereby produce a propulsion system onto a train or any load as a retrofit.

Occurring on either side of the TZ are multiple subsidiary actions that work in sync to interweave rapidly internal polarity switching of translations of attract and repel. Throughout the approach of either central force system of magnetic fields and polarity orientation toward TZ there are multiple polarity switching of dominant $A_\beta$ and dominant $^-A_\beta$ until they reach TZ.

This invention adds another labeling of the magnetic fields and polarity orientations to the existing labels of North/South, Plus/Minus, Positive/Negative. The two new labels for the permanent magnet are $A_\beta/^-A_\beta$. ($A_\beta$) [Pronounced A-Sub-Beta] arbitrarily labels the first side of the permanent magnet and is arbitrarily chosen to represent the primary central force system of a single permanent magnet and ($^-A_\beta$) [Pronounced Inverse-A-Sub-Beta] arbitrarily labels the side opposite of the $A_\beta$ side but, is said to represent the inverse central force system of the same single permanent magnet.

There are multiple systems of magnetic fields and polarity orientations which encounter simultaneously with each other when the LSA configurations are in close proximity of the LPS series along the XZ-axis. All these encounters work asynchronously together to produce a net force that triggers multiple real time internal repel and attract switching actions that results in momentum and thereby producing a propulsion system for a train or any load as a retrofit.

The principles to initiate a propulsion system onto a train or any load as a retrofit consists of exciting the permanent magnets' internal switching actions of repel and attract environment. Achieving the properties for propulsion consisting of the two (2) asynchronous actions of attract and repel depends solely on the polarity orientation's internal switching actions of the LSA configurations against the LPS series.

For the repel actions ($A_\beta$ against $A_\beta$): The LPS series primary antithetical end emanate the force of magnetic fields and primary polarity orientation $A_\beta$ against the LSA configurations emanating the force of magnetic fields and primary polarity orientation $A_\beta$. The constant in this case being the LPS series dominant primary polarity orientation $A_\beta$ and the variable being the LSA configuration's dominant primary polarity orientation $A_\beta$.

For the attract actions ($A_\beta$ against $^-A_\beta$): The LPS series opposite antithetical end emanate the force of magnetic fields and inverse polarity orientation $^-A_\beta$ against the LSA configurations emanating the force of magnetic fields and primary polarity orientation $A_\beta$. The variable in this case being the LPS series dominant inverse polarity orientation $^-A_\beta$ and the constant being the LSA configuration's dominant primary polarity orientation $A_\beta$.

The principles for the components needed to produce asynchronous actions of repel and attract forces to be used for propulsion for the antithetical action ends of the LPS series are as follows: for the attract action, the LPS series antithetical end force of magnetic field and primary polarity orientation $A_\beta$ against the LSA configurations force of magnetic fields and primary polarity orientation $A_\beta$. For the repel action, simultaneously occurring at the other end of the same LPS series is an attract action force of magnetic fields and inverse polarity orientation $^-A_\beta$ end against the LSA configuration force of magnetic field and polarity orientation $A_\beta$.

The net force for this present invention for polarity orientation switching actions of repel and attract between the encountering of these independent systems of magnetic fields and polarity orientations meet all force requirements needed to overcome the force dynamic for initial momentum for a train or any load as a retrofit. They also meet the requirements when the train or any load as a retrofit is at rest and during continuous acceleration for high speeds, as well as a reversal of the direction of the force to apply for slow down and braking.

It is an object of the present invention to provide a propulsion system that would be exemplary for lower-speed, low noise applications as well as a quick response time for acceleration, such as for urban train systems, freight yard infrastructures on any load as a retrofit, and distance travel systems where it is desirable to employ propulsion systems that are simple in construction, maintenance, and operation and that have low noise at rest and at all speeds.

It is another object of the present invention to produce propulsion by using the magnetic fields and polarity orientation being produced by a first set of permanent magnets that form the LPS series; positioning the first set to obtain a repelling action and simultaneously obtain an attracting action at antithetical ends against the magnetic fields and polarity orientation being produced by a second set of LSA configuration permanent magnets.

When such magnetic fields and polarity orientation elements interact with one another, their interactions synchronously produce an attracting force and repelling force along the same XZ-plane and YZ-plane of their encountering magnetic fields and polarity orientations. The repelling and attracting magnetic fields and polarity orientations initiate an internal switching of the repel and attract actions to produce object initial momentum, object acceleration, and object high-speeds. All this occurs within the force parameter requirements of the force emanating from the encountering of the LPS series against the LSA configurations. The force required to produce a propulsion system onto a train or any load as a retrofit is embodied in the internal switching actions interactions between the force of the magnetic fields and polarity orientation system of the LPS series against the force of magnetic fields and polarity orientations emanating from the LSA configuration.

Object initial momentum occurs when the force of magnetic fields and polarity orientations being produced by a first set of the LSA configurations onboard the train or any load as a retrofit obtain simultaneous internal polarity orientation switching actions of repel and attract. The repel and attract actions occur along the XZ-plane and YZ-plane against a second set of forces of magnetic fields and polarity orientation being produced by the LPS series tracks.

An important advance result from the use of this type of permanent magnet setting is the force needed for the propulsion component of the magnetic field and polarity orientation can be achieved without an electromagnetic system or any power source off the grid. For propulsion at high speeds, our innovative system uses the magnetic field and polarity orientations of the LPS series against the magnetic field and polarity orientation of the LSA configurations and thereby replace the use of the properties of electromagnetism.

Another important advance is the energy needed to alternate the properties of attract and repel at a quick rate for forward propel can be achieved without external switching mechanisms. Current configuration of an electromagnetic system uses external command sequences to switch the polarity orientations, but the present invention uses the non-interrupted internal polarity orientation alternating flux properties found within the boundaries of the permanent magnet itself. The continuous encountering of the LPS series forces of magnetic fields and polarity orientations against the LSA system forces of magnetic fields and polarity orientations can be used for initial momentum, acceleration, deceleration, slowing down, and braking for a train or any load as a retrofit.

The efficiency, simplicity, reliability, and the precision for momentum at load rest and continuous acceleration, deceleration and braking observed in this invention surpasses all previous methods. Its switching actions of polarity orientations and magnetic fields are not performed externally but internally, therewith, it needs no external command for polarity orientation switching. This invention presents a unique way of internally switching the attract and repel actions within the properties of the permanent magnet for propulsion.

BRIEF DESCRIPTION OF DRAWINGS

Some embodiments of this invention herein have been described and illustrated with reference to the embodiments of the figures but it should be understood that the features and operation of the invention as described are susceptible to modification and alteration without departing significantly from the spirit of the invention. For example, the dimensions, size, the shape of the various elements may be altered to fit specific applications. Accordingly, the specific embodiments illustrated and described herein are for illustrative purposes.

Although the invention is generally described in the context of these embodiments, it should be understood that it is not intended to be limited to only these embodiments. Certain elements in the drawings may be illustrated not-to-scale for illustrative clarity.

Figure 1A:
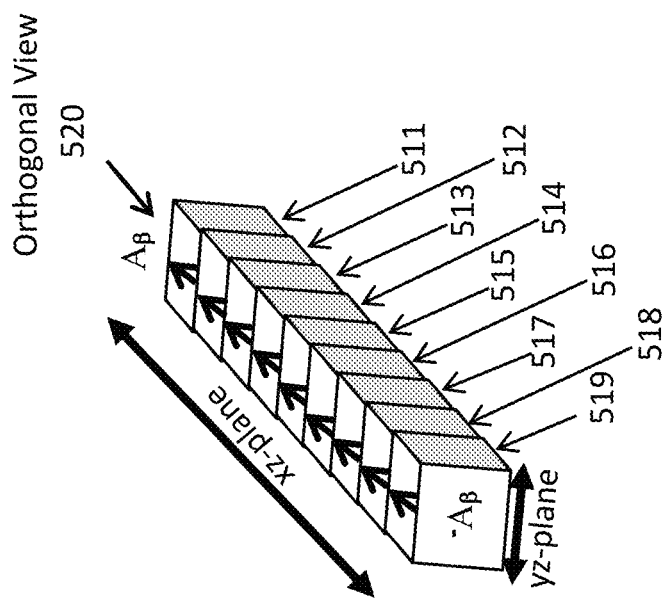
Figure 1A:
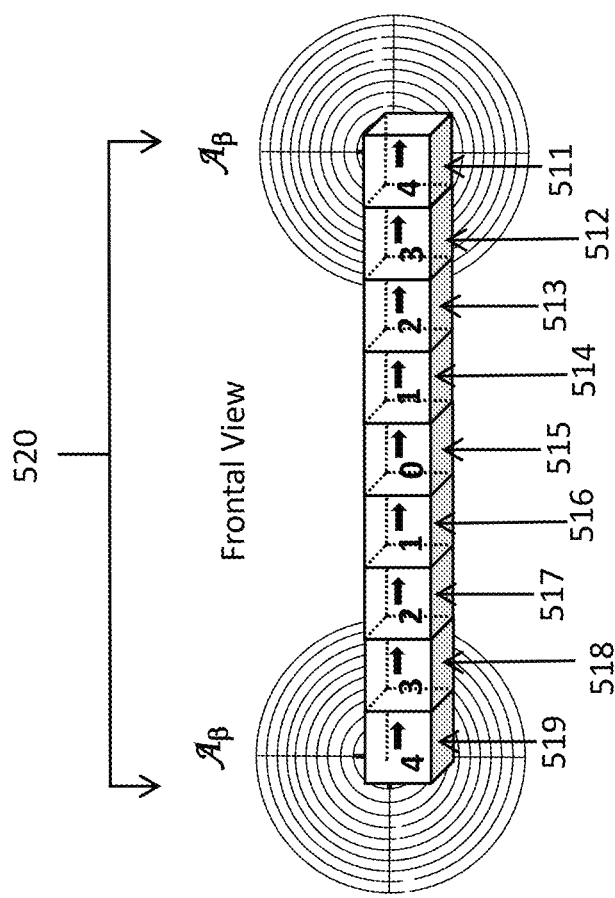

The structure, operation, and advantages of the present embodiments of the invention may become further apparent upon consideration of the following description taken in conjunction with the accompanying drawings, wherein:

FIG. 1A: depicts seven permanent magnets in connection at the attract points to form a nine-magnet arrangement of the LPS series. One end of the series is labeled as the primary $A_\beta$ central force system and the other end of the same series is labeled as the primary's inverse $^-A_p$ central force system.

Figure 1B:
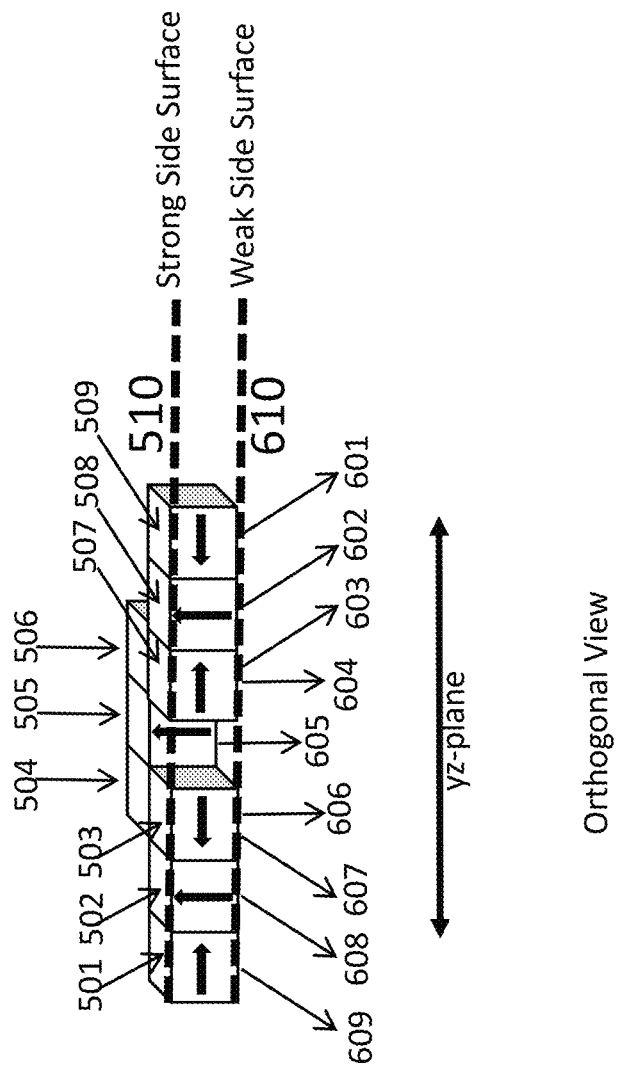

FIG. 1B: depicts three London Assemblage (LA) configurations in connection on either end of the backside of a single LA configuration. The three LA connections makes a new configuration called the London Spinal Assemblage (LSA) configuration.

Figure 1C:
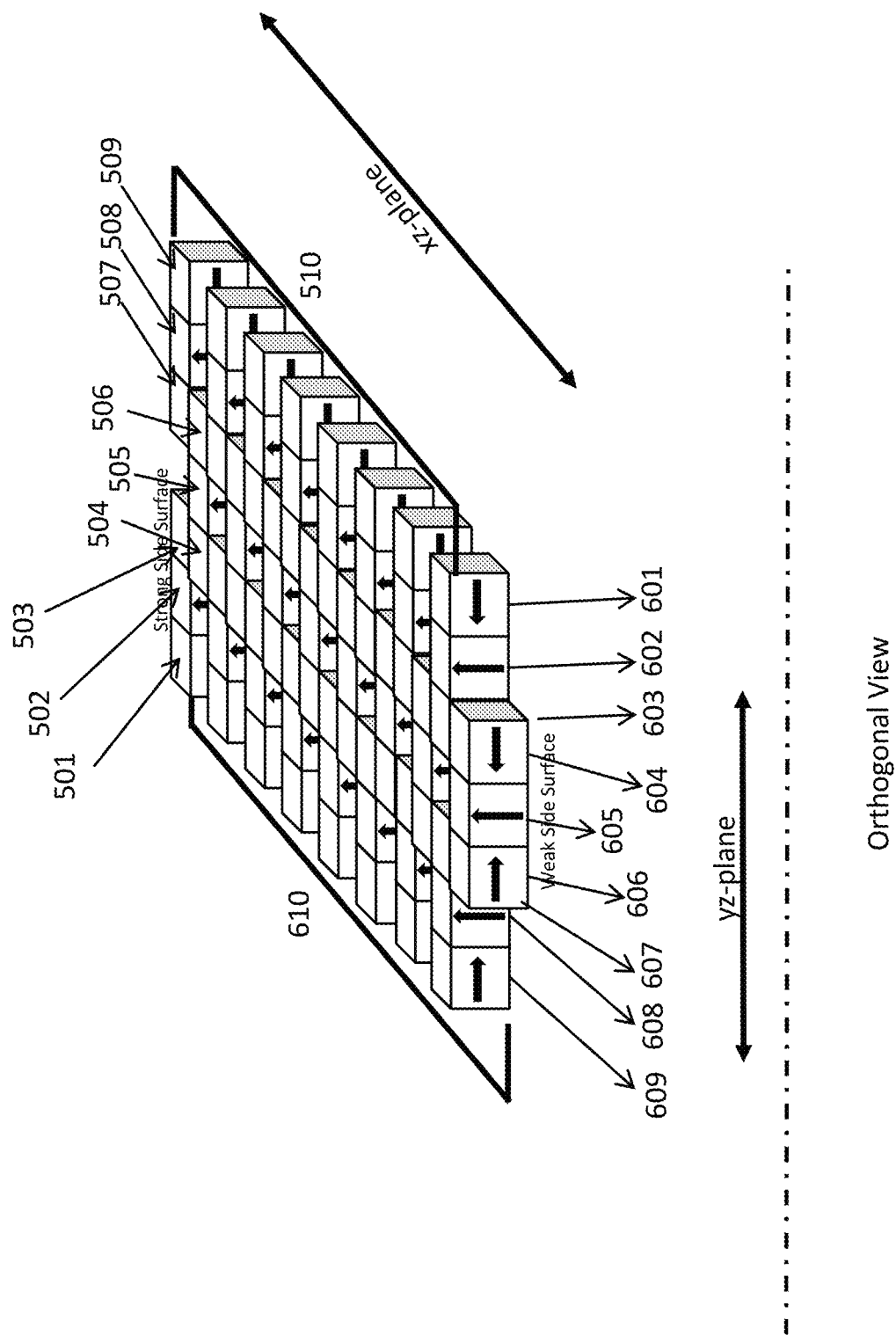

FIG. 1C: depicts an orthogonal view of several of the LSA configurations in connection along the XZ-plane. The LSA configurations form a complete connection when each LA_Head and its two LA_Wings are fully connected together.

Figure 1D:
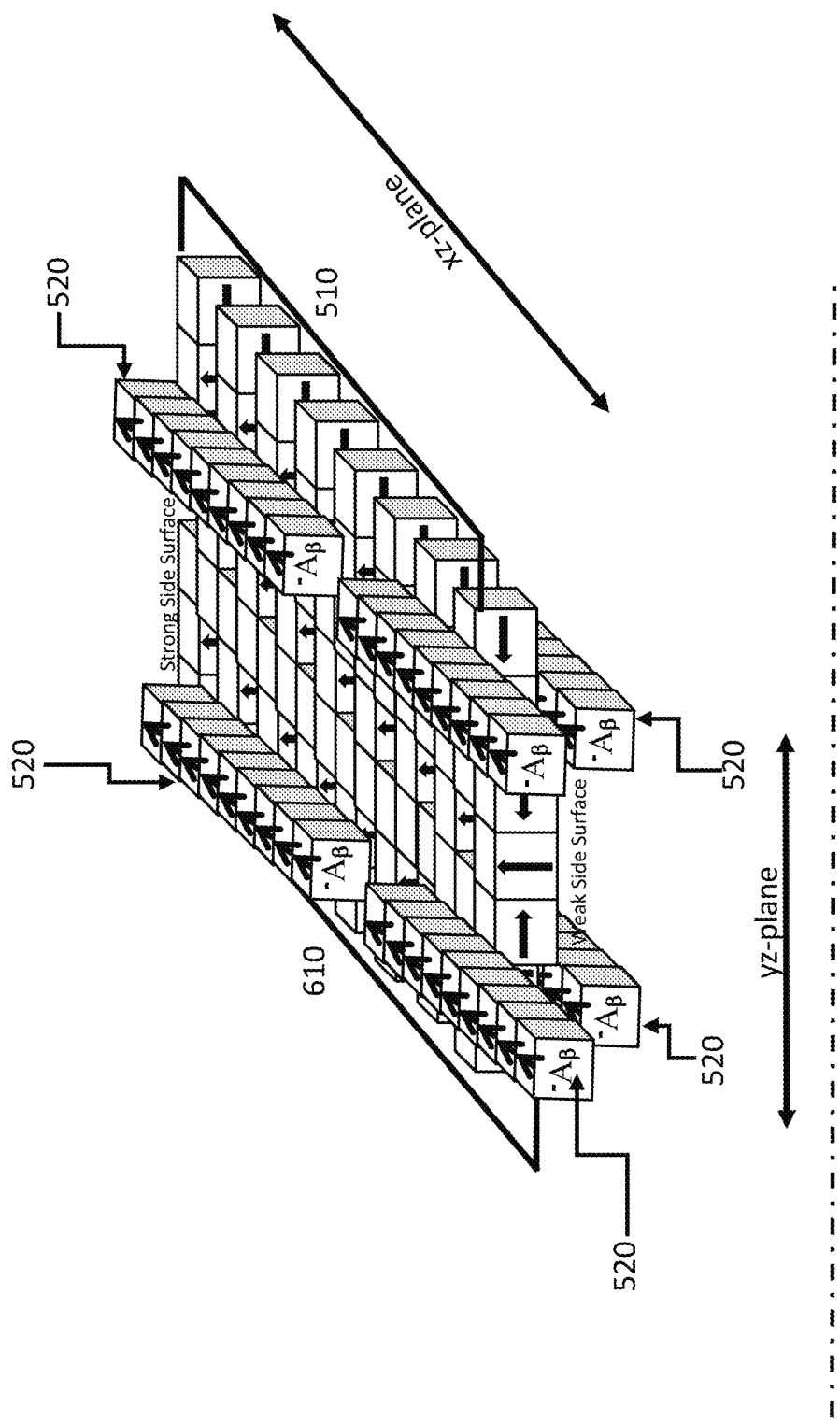

FIG. 1D: depicts an orthogonal view of the LSA configurations set between four sets of the LPS series on the strong side and another four sets of the LPS series on the weak side.

Figure 1E:
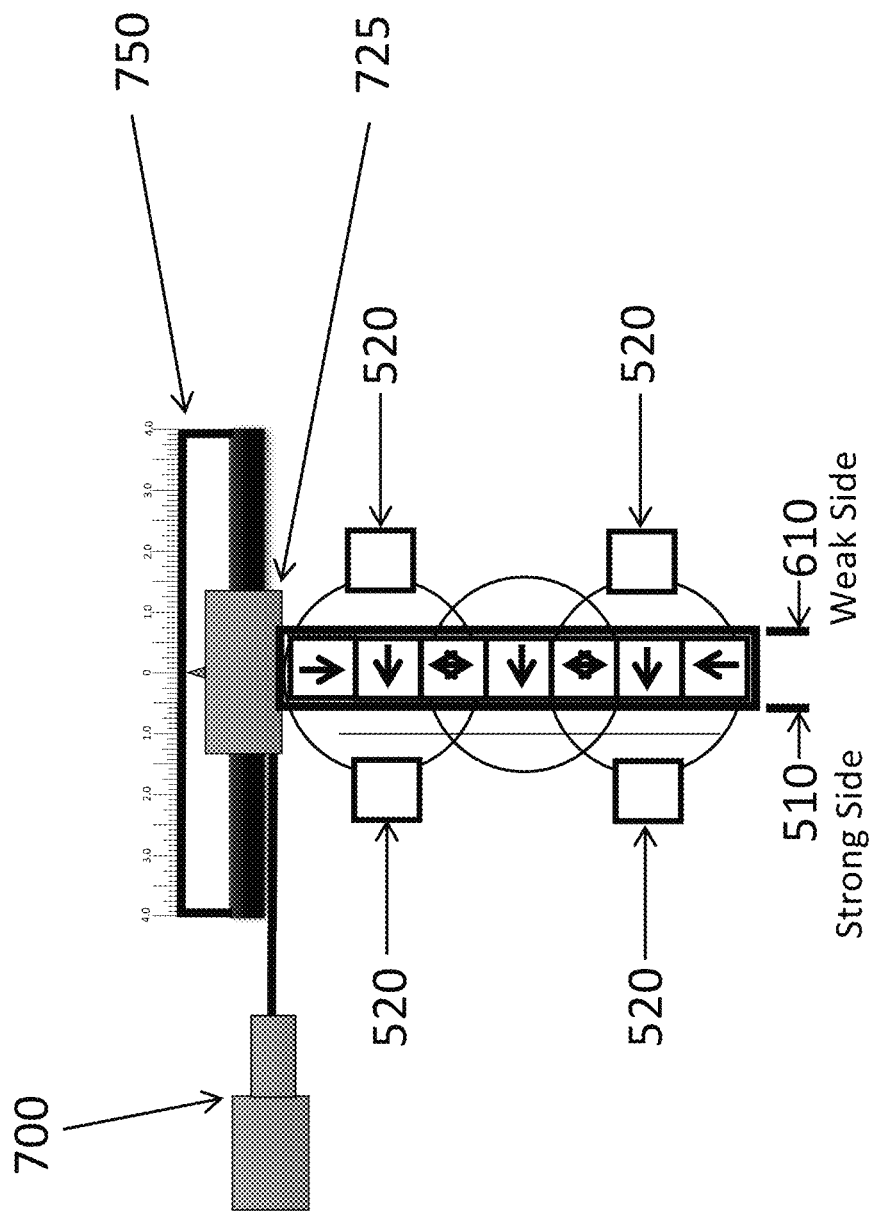

FIG. 1E depicts a frontal view of the LSA configurations between eight of the LPS series in a vertical position along with a pressure pump having a horizontal distance gauge and pressure pump according to the present embodiment.

Figure 1F:
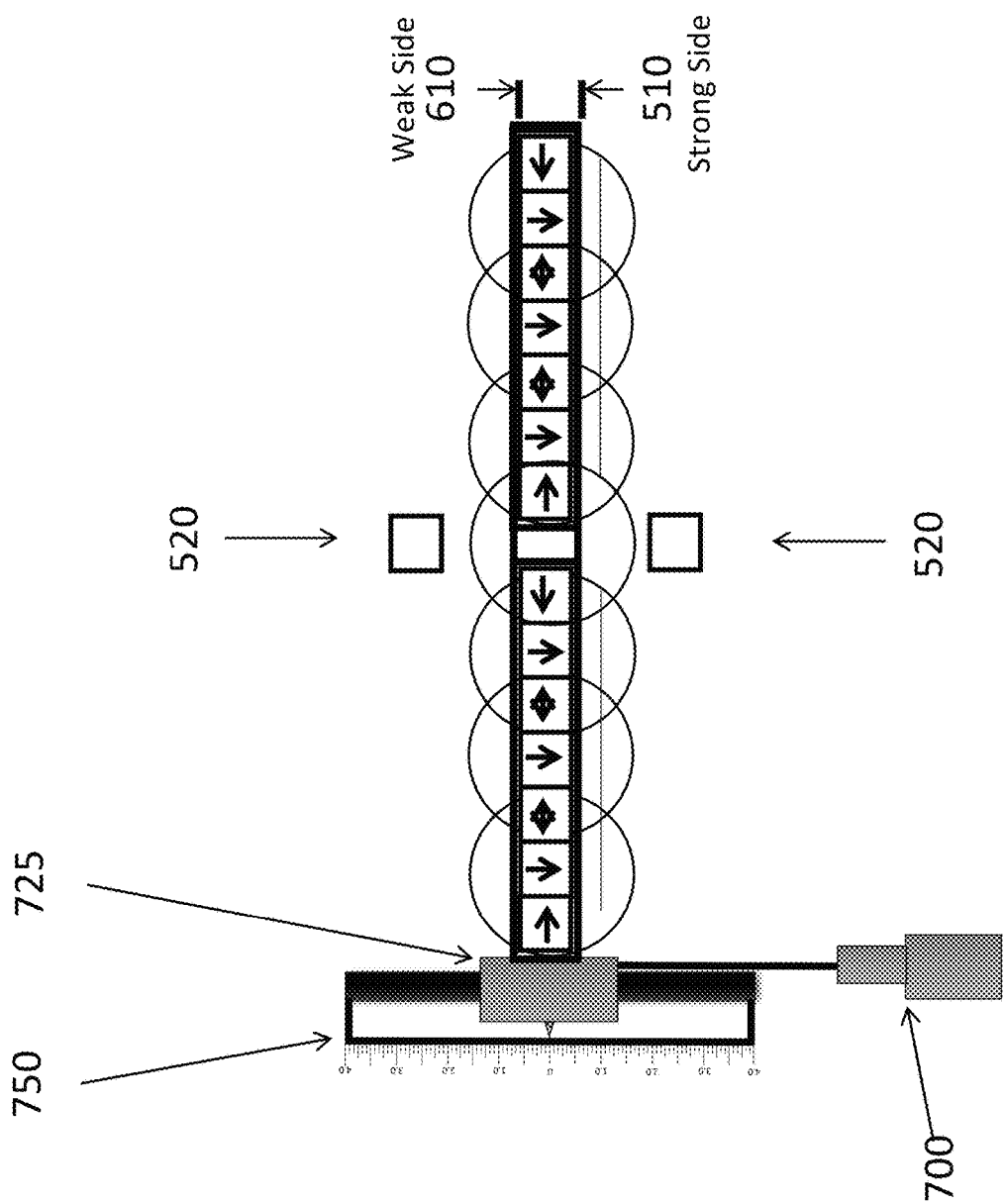

FIG. 1F depicts an added LSA configuration to FIG. 1E. FIG. 1F is a frontal view of two LSA configurations in parallel along the YZ-axis between two of the LPS series in a horizontal position along with a pressure pump having a vertical distance gauge and pressure pump according to the present embodiment.

FIG. 2A depicts an Angled view of the JURLYN and the LPS series in connection, according to the present embodiment.

Figure 2B:
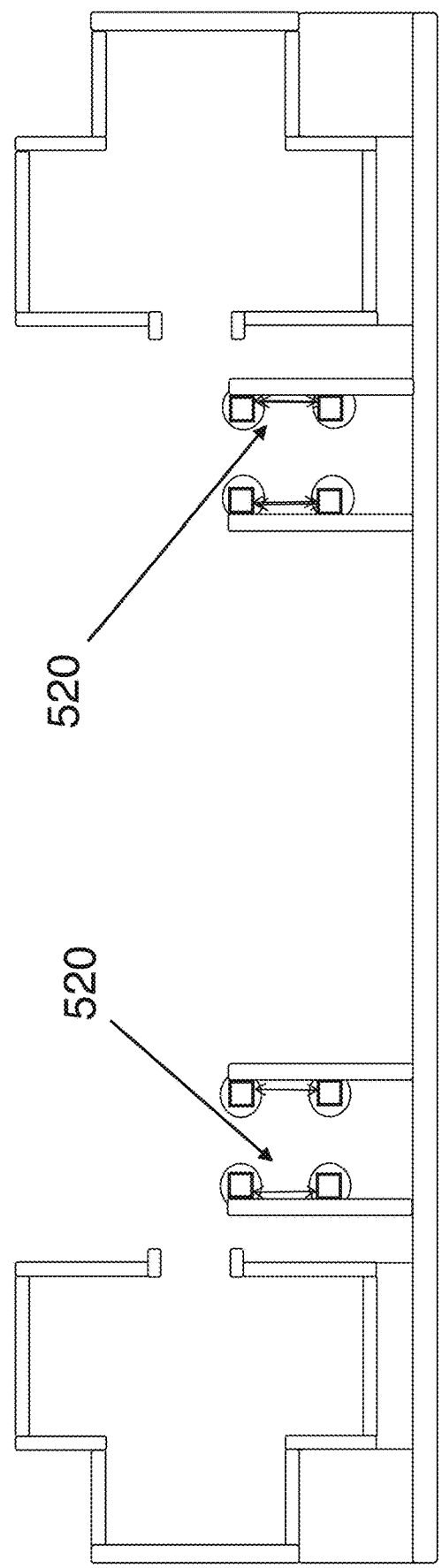

FIG. 2B depicts the Frontal view of the LSA configurations of magnetic fields and polarity orientation of FIG. 1D, according to the present embodiment.

Figure 2C:
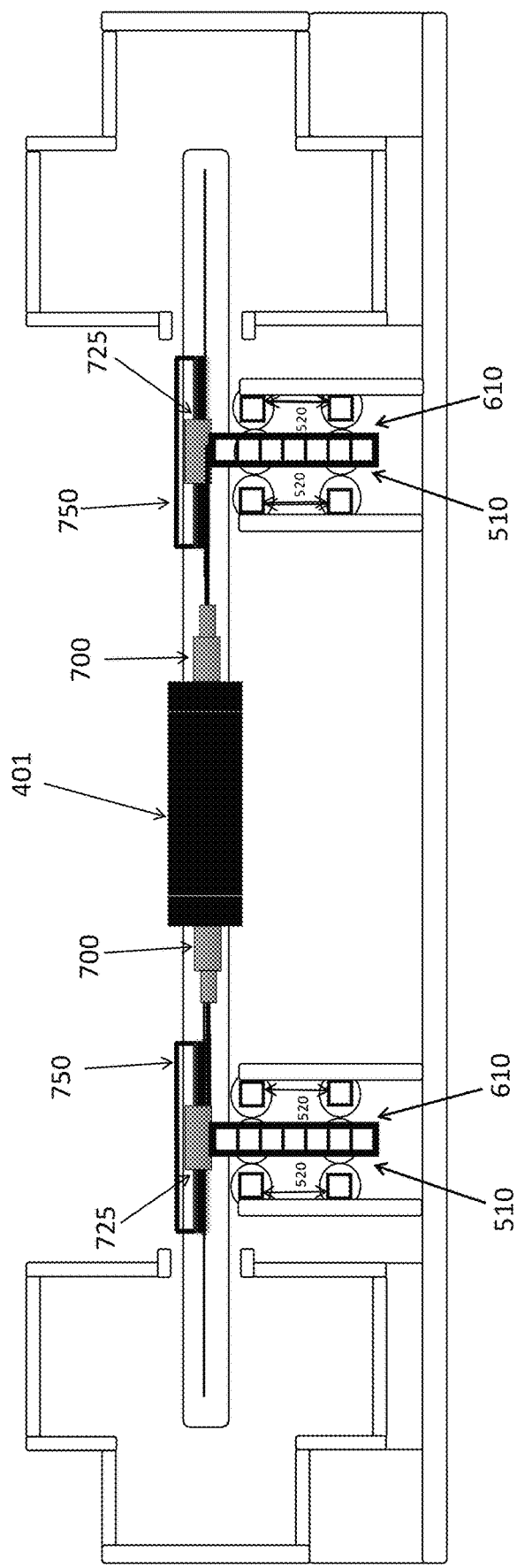

FIG. 2C depicts the Frontal view of the JURLYN and the force interactions of the LPS series and the LSA configurations net force of magnetic fields and polarity orientations producing the propulsion actions on the strong side force vector component and braking actions the weak side force vector component, according to the present embodiment.

Figure 2D:
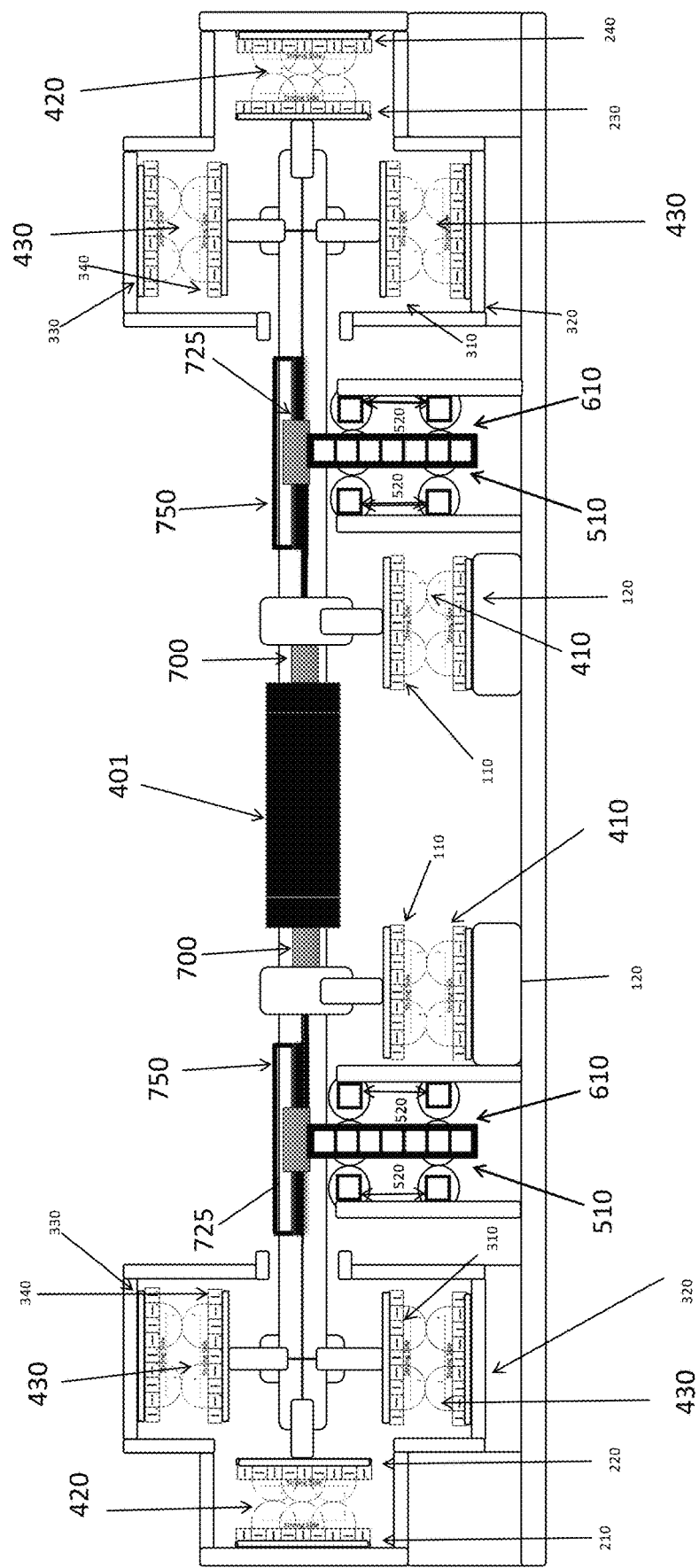

FIG. 2D: depicts the overall view of the completed propulsion components being used with the Magnetic Acceleration levitation system of the previous U.S. Pat. No. 10,428,469 according to the present embodiment.

DEFINITIONS

The Force of Magnetic Field and Primary Polarity Orientation ($A_\beta$) [Pronounced A-Sub-Beta]: The first of the two central force systems of a single permanent magnet that is arbitrarily labeled as its Primary Central Force (PCF) System.

The Force of Magnetic Field and Inverse Polarity Orientation ($^-A_\beta$) [Pronounced Inverse-A-Sub-Beta]: The second of the two central force systems of the same single permanent magnet that is the default to the primary central force system and is arbitrarily labeled as its Inverse Central Force (ICF) system.

The London Assemblage (LA) configuration: a special arrangement of permanent magnets that makes the forces of magnetic fields and polarity orientations on one set of the magnet have minimized drop edges on all sides of its particular configuration. Having more than one of the LA configurations connected in a particular configuration can produce the force of magnetic fields and polarity orientation to emanate characteristics along the XZ-axis and YZ-axis at the same location. Its stabilized multidirectional magnetic waves are called the London Assemblage Waves (LA-Waves).

The London Spinal Assemblage (LSA) configuration: When three of the LA configurations are joined together at certain of their drop edges to form the LSA configuration. The single LA configuration at the forefront of the LSA configuration is called the LA_Head, while the two connecting LA configurations on either side of the LA_Head are called the LA_Wings. The side of the LSA configuration with the arrow pointing upward indicates the direction of the strong force of magnetic fields and polarity orientation. The side opposite of the pointing arrow indicates the direction of the weaker force of magnetic fields and polarity orientation. LSA Configuration First Rule (LSAR_01): A single LA_Head having LA_Wings on either side must be read in the direction beginning from the LA_Head to LA_Wings.

LPS series First Rule (LPSR_01): A single LPS series must be read in the direction beginning from the force of magnetic fields and dominant primary polarity orientations ($A_\beta$) to the force of magnetic fields and inverse polarity orientations ($^-A_\beta$).

Linear Polarity Switching (LPS) series: A series of permanent magnets joined at their points of attraction to produce antithetical ends of actions of forces of magnetic fields and a dominant polarity orientation. At one antithetical end of the LPS series is the PCF system $A_\beta$ and at its other antithetical end is the ICF system $^-A_\beta$. Midway between the dominant PCF system and the dominant ICF system is the Translation Zone where both respective dominant systems become subsidiary to the other's dominant system.

Translation Zone (TZ): When both ends of independent dominant polarity orientation have their independent central force systems approach the other's; and when they reach a midpoint where neither polarity orientation dominates, each independent polarity orientation translates from a status of polarity orientation dominancy to a status of being minor in the regions of the other polarity orientation.

Translation Polarity Orientation Toggling (TPOT): As both dominant polarity orientation ends translate toward the TZ and begin to translate toward the others dominant end, their respective force of magnetic fields and polarity orientation emanate through all the permanent magnets in connection making up the LPS series. Both continue a pattern of toggling actions of dominant polarity orientations, respectively, until both independent dominant polarity orientations reach a point between them of equal dominancy at TZ.

When the $A_\beta$ end of an external permanent magnet begins at the TZ of the LPS series of the permanent magnets, as the external magnet approach the dominant $^-A_\beta$ end along the LPS series, its force of attract actions increase and dominate over its force of repel actions, as it approaches the dominant $A_\beta$ end along the same LPS series its force of repel actions increase and dominate over its force of attract actions.

When the $^-A_\beta$ end of an external permanent magnet begins at the TZ of the LPS series of the permanent magnets, as the external magnet approach the dominant $A_\beta$ end along the LPS series, its force of attract actions increase and dominate over its force of repel actions, as it approaches the dominant $^-A_\beta$ end along the same LPS series, its force of repel actions increase and dominate over its force of attract actions.

The Pressure Pump ($P^2$): The pump that controls the gap distance between the LPS series and the LSA configurations and is connected to $P^2$ 725 and $P^2$ 750 may continually be commanded to initiate movements inward and outward to maintain the position of the train or any load as a retrofit, as needed, to a position of propulsion stability until the train or any load as a retrofit come to a state of rest again.

Pressure Pump the connection of a Pressure Pump (Lev-1) 121 unit and the embodiment in FIG. 1B. This connection controls the gap distance between the LR100 series 110 and the LTD200 120 series magnetic fields of force. This pressure pump 121 is attached to the LR100 110 series casement and performs adjustments upon the casement of the LR100 110 series thereby, moving the magnetic fields of force of that casement with advancements toward and away from LTD200 120 series magnetic fields of force.

DETAILED DESCRIPTION

It is to be understood that the disclosure of the invention in this specification includes all possible combinations of such features. For example, where a feature is disclosed in the context of an aspect or embodiment of the invention, or a claim, that feature can also be used—to the extent possible—in combination with and/or in the context of other aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

This application discloses a number of improvements over and enhancements to the propulsion system disclosed in the inventor's U.S. Pat. No. 10,428,469 (the "469 patent") [Dunham], which is incorporated herein by this reference.

The present invention provides major advantages to existing propulsion systems because of the low cost of construction and maintenance, low noise in operation, the force of the magnetic fields and polarity orientation are obtained without currents, and many other benefits. During operation the force is determined by the remnant field of the permanent magnets whereby the force ratio at initial rest position and at operating loads remains constant throughout initial momentum and acceleration of the train or any load as a retrofit until it returns to its respective rest. This new configuration provides a continuous force for either acceleration or deceleration displacements of the arrays from the centered position, and thus can counteract aerodynamic loads, should they result in propulsion and drive forces, such as in rocket launcher applications and satellite deployment.

The present invention is also ideal for a frictionless environment, because it introduces controlled, stable, and uniformed forces of magnetic fields and polarity orientations at a continual and constant emanation throughout the distance of the encountering LPS series and LSA configurations. In the present invention, both repelling and attracting action properties are produced by the interaction of flux-concentrated forces of magnetic fields and polarity orientations between the encountering of the antithetical action dominant ends of the LPS series against the LSA configurations.

The magnetic field and polarity orientations emanating from the LSA configuration onboard a train or load as a retrofit arranged to interact perpendicularly with the multiple forces of magnetic fields and polarity orientations emanating from the LPS series along the XZ-plane. Together they maintain a stable, uniformed and leveled sheet of magnetic fields and polarity orientations that can be used for repelling and attracting actions along the XZ-plane. These repelling and attracting actions of forces of magnetic fields and polarity orientations may be applied to accelerate a high-speed object within the weight limits of the magnetic field magnitude along the XZ-plane.

FIG. 1A illustrates the forces of magnetic fields and two dominant primary and inverse polarity orientations ($A_\beta$ and $^-A_\beta$) of the LPS series and the LPS100 520. The LPS100 520 is such that the vertical force components of the combined magnetic fields and primary and inverse polarity orientations ($A_\beta$ and $^-A_\beta$) add to the antithetical actions of attract and repel along the horizontal XZ-plane. The magnet poles LPS201 511, LPS202 512, LPS203 513, LPS204 514, LPS205 515, LPS206 516, LPS207 517, LPS208 518 and LPS209 519 of the LPS100 520 are connected at their points of attraction to produce the force of the dominant $A_\beta$ component at one end of the LPS series and the force of the dominant $^-A_\beta$ component at the other end of the same LPS series. In this particular figure, magnet LPS205 515 is the zeroth magnet along the XZ-plane along the horizontal plane of the LPS series.

From the zeroth position of the LPS100 520 and approaching the dominant inverse central force system of the $^-A_\beta$ ends are magnets LPS201 511, LPS202 512, LPS203 513 and LPS204 514 of the LPS100 520. And from the zeroth position of the LPS100 520 and approaching the dominant primary central force system of the $A_\beta$ end are magnets, LPS206 516, LPS207 517, LPS208 518 and LPS209 519 of the LPS100 520.

With the magnet configuration, no current is needed from an electric grid or external source to produce momentum and continuous propulsion for the train or any load as a retrofit. This is because there is a net force of magnetic fields and two dominant polarity orientations ($A_\beta$ and $^-A_\beta$) present in the LPS series that asynchronously excite the internal switching actions of repelling and attracting forces of magnetic fields and polarity ($A_\beta$ and $^-A_\beta$) emanating from antithetical ends of the LPS series. The interaction of the net forces of the magnetic fields and polarity orientations ($A_\beta$ and $^-A_\beta$) between the LPS series produce a uniformed and stable environment for propulsion onboard the train or any load as a retrofit within the specs of their attract force and repel force perimeters.

An advantage of this permanent magnet system is that it provides continuous antithetical actions at both ends and, when in close proximity of the LSA configuration ($A_\beta$), the force of their interacting magnetic fields and polarity orientations ($A_\beta$ and $^-A_\beta$) enables a train or any other type of device or load to be retrofitted to achieve momentum and acceleration, slow down, and braking that could be employed either vertically or horizontally when interacting with the components of the LSA configurations. Another advantage of the present configuration is that it produces a uniformed tripling of the LPS series net force of magnetic fields and two polarity orientations ($A_\beta$ and $^-A_\beta$) of the vertical fields from the permanent magnets. This leads to an increase of the force per unit area for a given area.

Thus, by increasing the area of the LPS series along the XZ plane, the efficiency of the propulsion can be increased. This effect may be accomplished by either adjusting the number of permanent magnets in the series of LPS100 520 to make the central force between ($A_\beta$ and -$A_\beta$) lesser or greater by making the area of the LPS series of the LPS100 520 array wider or thinner with respect to the LPS200 520 while maintaining their margins to be equal to the other. Even again, another advantage is that, the need to use the electrical grid is virtually eliminated from both the LSA configuration onboard the train or any load as a retrofit and the LPS series in track formation. Neither, of the two have any need to use the electrical grid for power to maintain current for continuance acceleration for a train or any load as a retrofit.

FIG. 1B (Strong Side Surface ($A_\beta$)) illustrates one embodiment of the London Spinal Assemblage (LSA) configuration to have an independent Strong Side Surface ($A_\beta$) being used for control of the velocity for the train or any load as a retrofit (LSA400 510). The primary polarity orientation ($A_\beta$) of the LSA configuration onboard the train or any load as a retrofit is such that the orientation of the vertical components of forces of the magnetic fields and dominant primary polarity orientation ($A_\beta$) add, while the orientation of their horizontal components repels. The three magnet poles LSA402 502, LSA405 505 and LSA408 508 are on the side of the arrow and indicate the Strong Side Surface of the LSA400 510. Poles LSA401 501, LSA403 503 and LSA404 504, LSA406 506 and LSA407 507, LSA409 509 of the LSA400 510 point toward the center pole of their respective array, producing the force of the magnetic field and dominant primary polarity orientation ($A_\beta$) along the YZ-plane on the Strong Side Surface.

Weak Side Surface ($A_\beta$)) depicts the London Spinal Assemblage (LSA) configuration to have an independent Weak Side Surface ($A_\beta$) being used for control of the velocity for the train or any load as a retrofit (LSA400 610). The primary polarity orientation ($A_\beta$) of the LSA configuration onboard the train or any load as a retrofit is such that the dominant primary polarity orientation ($A_\beta$) of the vertical component forces of magnetic fields and dominant primary polarity orientation ($A_\beta$) add, while the dominant primary polarity orientation ($A_p$) of their horizontal components repels. The three magnet poles LSA402 602, LSA405 605 and LSA408 608 are on the side opposite of the arrow and indicate the Weak Side Surface of the LSA400 610. Poles LSA401 601, LSA403 603 and LSA404 604, LSA406 606 and LSA407 607, LSA409 609 of the LSA400 610 point toward the center pole of their respective array, producing the force of the magnetic field and dominant primary polarity orientation ($A_\beta$) along the YZ-plane on the Weak Side Surface ($A_\beta$).

With this magnet configuration, no current is needed from the grid or from any external source to produce momentum. This is because there is a net force of magnetic fields and primary polarity orientations ($A_\beta$) present in one LSA configuration to yield the actions of attract and repel forces of magnetic fields and polarity orientations ($A_\beta$ and $^-A_\beta$) onto a second set of the LPS series. The interaction between the LSA configurations and the LPS series produces a stable propulsion environment for the train or any load as a retrofit within the specs of their pushing and pulling perimeters. There is also a presence of a continuous force of magnetic fields and polarity orientations being exerted between the LSA configurations and the LPS series. An advantage of such a system is that it provides a centering action to the lateral and horizontal ends onboard the train or any load as a retrofit, one that could be employed either vertically or horizontally.

Another advantage of the present configuration is that it produces a tripling force of magnetic fields and dominant primary polarity orientations ($A_\beta$) of the horizontal field from the magnets. This leads to an increased net force of the LSA configurations per unit area for a given array.

Thus, by increasing the area of the LSA configurations, the LSA configuration efficiency can be increased. This effect can be accomplished by adding another LSA400 510 along its YZ-plane, maintaining their margins to be equal to the other. Even again, another advantage is that, the need to use the grid is virtually eliminated from both the load usage for propulsion, because it has no need to use the grid for power to maintain current for continuance propulsion onboard the train or any load as a retrofit.

FIG. 1C shows an illustration of one embodiment with five (8) columns of LSA's 510 called the London Spinal Assemblage configurations, with horizontal net forces of magnetic fields and primary polarity orientations ($A_\beta$) is such that the orientation of the vertical component forces of the magnetic fields and primary polarity orientations ($A_\beta$) add, while the primary polarity orientation of their horizontal actions of attract and repel of forces of magnetic fields and primary polarity orientations along the YZ-plane. The three magnet poles LSA402 502, LSA405 505 and LSA408 508 are on the side of the arrow pointing toward the Strong Side Surface of the LSA400 510. Poles LSA401 501, LSA403 503 and LSA404 504, LSA406 506 and LSA407 507, LSA409 509 of the LSA400 510 point toward the center pole of their respective array, producing the force of the magnetic field and dominant primary polarity orientation ($A_\beta$) along the YZ-plane and the XZ-plane on the Strong Side Surface. Also note that the three magnet poles LSA402 602, LSA405 605 and LSA408 608 are on the side opposite of the arrow and indicate the Weak Side Surface of the LSA400 610. Poles LSA401 601, LSA403 603 and LSA404 604, LSA406 606 and LSA407 607, LSA409 609 of the LSA400 610 point toward the center pole of their respective array, producing the force of the magnetic field and dominant primary polarity orientation ($A_\beta$) along the YZ-plane and the XZ-plane on the Weak Side Surface.

With this type of a permanent magnet configuration, no current is needed from the grid or from any external source to produce lateral stable momentum for a train or any load as a retrofit, because, there are forces of magnetic fields and dominant primary polarity orientations ($A_\beta$) present in one LSA configuration to yield actions of repel and attract forces of magnetic field and polarity orientations ($A_\beta$) against a second set of LPS series ($A_\beta$ and $^-A_\beta$) and this interaction between the LSA's ($A_\beta$) and the LPS series ($A_\beta$ and $^-A_\beta$) produce a stable momentum environment for a train or any load as a retrofit within the specs of their pushing and pulling perimeters. An advantage of such a system is that it provides a dominant polarity switching action to the momentum ends of a train or any load as a retrofit, one that could be employed either vertically or horizontally.

FIG. 1D shows an illustration of one embodiment with five (8) columns of Inner LSA's 510 configurations between four (4) Outer series of LPS's 520 on the Strong Side Surface of the LSA configuration columns and four (4) Outer series of LPS's 520, on the Weak Side Surface of the same LSA configurations columns. The three magnet poles LSA402 502, LSA405 505 and LSA408 508 are on the side of the arrow and indicate the Strong Side Surface of the LSA400 510 are pointed towards the mid-plane between the arrays. Poles LSA401 501, LSA403 503 and LSA404 504, LSA406 506 and LSA407 507, LSA409 509 of the LSA400 510 point toward the center pole of their respective array, producing the force of the magnetic field and dominant primary polarity orientation ($A_\beta$) along the YZ-plane on the Strong Side Surface.

The forces of magnetic fields and two dominant primary and inverse polarity orientations ($A_\beta$ and $^-A_\beta$) of the LPS series permanent magnet poles LPS201 511, LPS202 512, LPS203 513, LPS204 514, LPS205 515, LPS206 516, LPS207 517, LPS208 518 and LPS209 519 of the LPS100 520 have their arrows pointing perpendicularly to the arrows pointing in the LSA configurations. The net forces of magnetic fields and dominant primary and inverse polarity orientations ($A_\beta$ and $^-A_\beta$) on the LPS series are set perpendicularly to the net forces of magnetic fields and dominant primary polarity orientations ($A_\beta$) of the LSA configurations, thereby, producing the net force actions of attract and repel between their encounter to result in momentum for either the LSA configurations or the LPS series along the XZ-plane.

The LSA configurations and the four (4) LPS series on Strong Side Surface of the LSA 510 configurations, along with the four (4) LPS series on Weak Side Surface of the LSA 610 configurations, have their horizontal net forces of magnetic fields and dominant primary polarity orientations ($A_\beta$) is such that the orientation of the vertical components of their net forces of magnetic fields and dominant primary polarity orientations ($A_\beta$) add the actions of attract and repel.

The LSA configurations are oriented to the LPS series to excite the actions of attract and repel horizontally according to the present invention. The inner LSA's 510 configurations net forces of magnetic fields and dominant primary polarity orientation ($A_\beta$) may be attached to and located on a train or any load as a retrofit to encounter and initiate the actions of attract and repel against the forces of magnetic fields and dominant polarity orientations ($A_\beta$ and $^-A_\beta$) of the LPS series. The objective of the LSA configuration is to orient forces of magnetic fields and dominant primary polarity orientation ($A_\beta$) on the Strong Side Surface ($A_\beta$) and Weak Side Surface ($A_\beta$) of a train or any load as a retrofit against the forces of magnetic fields and dominant polarity orientations ($A_\beta$ and $^-A_\beta$) on the LPS series in such a way that their net forces combine and produce a net force focal point of momentum for a train or any load as a retrofit.

This invention uses the rule of the LSAR_01 and the LPSR_01 to determine the direction of momentum for the LSA configurations Strong Side Surface when it is considered to be the variable against the LPS series when it is fixed. To achieve momentum, the arrangement of the forces of magnetic fields and dominant polarity orientations ($A_\beta$ and $^-A_\beta$) on the LPS series are set perpendicular to the Strong Side Surface forces of magnetic fields and dominant polarity orientations ($A_\beta$) on the LPS series. The LSA configurations and the arrow direction of the LPS series dictate that the direction of momentum for the LSA configuration is in the direction opposite of the direction of the pointed arrows of the LPS series for the present invention.

This invention uses the rule of the LSAR_01 and the LPSR_01 to determine the direction of momentum for the LSA configurations Weak Side Surface when it is considered to be the variable against the LPS series when it is fixed. To achieve momentum, the arrangement of the forces of magnetic fields and dominant polarity orientations ($A_\beta$ and $^-A_\beta$) on the LPS series are set perpendicular to the Weak Side Surface forces of magnetic fields and dominant polarity orientations ($A_\beta$) on the LPS series. The LSA configurations and the arrow direction of the LPS series dictate that the direction of momentum for the LSA configuration is in the direction of the pointed arrows of the LPS series for the present invention.

With the permanent magnet configurations and series, no current is needed from the grid or from any external source, to produce stabile momentum along the XZ-plane to be used for acceleration, slow down and braking for a train or any load as a retrofit. Because, there are encountering forces of magnetic field and dominant primary polarity orientations ($A_\beta$) from the LSA configuration present to yield the polarity switching actions of attract and repel against the forces of magnetic field and dominant primary and inverse polarity orientations ($A_\beta$ and $^-A_\beta$) from the LSA configuration, the propulsion system is continuous without interruption. This interaction between the LSA configurations and the LPS series is continuously producing a stable push and pull environment for a train or any load as a retrofit within the specs of their pushing and pulling perimeters. An advantage of such a system is that it provides a polarity switching action to the ends of a train or any load as a retrofit, one that could be employed either vertically or horizontally.

FIG. 1E depicts a frontal view of the LSA configurations set between four (4) sets of the LPS series on its strong side and four (4) sets of the LPS series on its weak side. All eight of the LPS series have their central force system of magnetic fields and inverse polarity orientation of the dominant $^-A_\beta$ side set with the direction of the LA_Head to LA_Wings along the XZ-plane of the LSA configurations. All eight of the LPS series have their central force system of magnetic fields and primary polarity orientation of the dominant $A_\beta$ side set with the direction of the LA_Wings to LA_Head along the XZ-plane of the LSA configurations.

FIG. 1E shows the connection of Pressure Pump ($P^2$) 700. $P^2$ 700 is connected to 725 and 750, respectively to the two (2) sided configuration LSA400 510 and LSA400 610. The $P^2$ 700 controls the force of magnetic fields and primary polarity orientations ($A_\beta$) on the LSA400 510 Strong Side Surface and the force of magnetic fields and primary polarity orientations ($A_\beta$) on the LSA400 610 Weak Side Surface. The pressure pump is attached to its respective casement and perform adjustments moving the force of magnetic fields and primary polarity orientations ($A_\beta$) with advancements toward and away from the net forces of magnetic fields and primary polarity orientations ($A_\beta$) of the LPS100 520 and advancements toward and away from the net forces of magnetic fields and inverse polarity orientations ($A_\beta$) of the LPS100 520, respectively.

FIG. 1E combines the embodiments from FIG. 1A and FIG. 1B to depict a magnet configuration in which the functions of the propulsion system are generated. $P^2$ 700 performs the stable and continuous adjustment to the forces of magnetic fields and polarity orientations being produced from the LSA Weak Side and Strong Side toward and away from the forces of the magnetic fields and polarity orientations of the LPS series antithetical ends of primary and inverse. The present invention is separate from other propulsion systems; giving the advantage of being able to tailor and control these functions optimally for their respective applications.

FIG. 1F depicts a frontal view of two (2) LSA configurations set in parallel between one (1) set of the LPS series on its strong side and one (1) set of the LPS series on its weak side. The one (1) set of the LPS series have their central force system of magnetic fields and inverse polarity orientation of the dominant $^-A_\beta$ side set with the direction of the LA_Head to LA_Wings along the XZ-plane of the LSA configurations. The one (1) of the LPS series have their central force system of magnetic fields and primary polarity orientation of the dominant $A_\beta$ side set with the direction of the LA_Wings to LA_Head along the XZ-plane of the LSA configurations.

FIG. 1F shows the connection of Pressure Pump ($P^2$) 700. $P^2$ 700 is connected to 725 and 750, respectively to the two (2) sided configuration LSA400 510 and LSA400 610. The $P^2$ 700 controls the force of magnetic fields and primary polarity orientations ($A_\beta$) on the LSA400 510 Strong Side Surface and the force of magnetic fields and primary polarity orientations ($A_\beta$) on the LSA400 610 Weak Side Surface. $P^2$ 700 is attached to its respective casement to perform adjustments moving the force of magnetic fields and primary polarity orientations ($A_\beta$) with advancements toward and away from the net forces of magnetic fields and primary polarity orientations ($A_\beta$) of the LPS100 520 and advancements toward and away from the net forces of magnetic fields and inverse polarity orientations ($A_\beta$) of the LPS100 520, respectively.

FIG. 1F combines the embodiment from FIG. 1A and two (2) embodiments from FIG. 1B positioned parallel to each other, to depict a magnet configuration in which the functions of the propulsion system are generated. $P^2$ 700 performs the stable and continuous adjustment to the forces of magnetic fields and polarity orientations being produced from the LSA Weak Side and Strong Side toward and away from the forces of the magnetic fields and polarity orientations of the LPS series antithetical ends of primary and inverse. This embodiment provides an improvement other propulsion systems by giving the advantage of being able to tailor and control these functions optimally for their respective applications.

FIG. 2A is a schematic representing the orthogonal Load Support System's full layout of the existing U.S. Pat. No. 10,428,469 (US Patent Issue Date: Oct. 1, 2019). The present invention introduces a propulsion system that can be attached to the Load Support System or train or any load as a retrofit, to receive commands from the $JURLYN_{Main-1}$ 401. FIG. 2B depicts the Frontal view of the LPS series forces of magnetic fields and polarity orientations. FIG. 2C depicts the Frontal view of the LSA configurations forces of magnetic fields and polarity orientations and the LPS series forces of magnetic fields and polarity orientations interacting, according to the present embodiment. FIG. 2D depicts the Frontal view of the completed MagAcc System with its combined systems of the Load Support System and the Propulsion system for a train or any load as a retrofit.

FIG. 2A is a schematic representing an embodiment of the full layout of the new Magnetic Acceleration (MagAcc) Propulsion System of FIG. 1A, which depicts the frontal view of the outer forces of magnetic fields and primary and inverse polarity orientations ($A_\beta$ and $^-A_\beta$) along the LPS series against the frontal view of FIG. 2B forces of magnetic fields and primary polarity orientations ($A_\beta$). FIG. 2B depicts how the two separate forces of magnetic fields and polarity orientations LPS series along the guideways interact against the forces of magnetic fields and polarity orientations onboard the train or any load as a retrofit, according to the present embodiment.

The $JURLYN_{Main-1}$ 401 is the main servo-control operating system for the MagAcc system. The $JURLYN's_{Main-1}$ Mid-Propulsion 810, Upper-Propulsion 820, and Lower-Propulsion 830 function independently, but, synchronous with all the other components of the MagAcc system. There are approximately twelve (12) forces of magnetic fields and polarity orientations tracts entwined in one MagAcc Propulsion System configuration.

The $JURLYN_{1a}$ 402 and the $JURLYN_{1b}$ 403 operate independently of each other but, synchronous for propulsion stability on the train or any load as a retrofit. Both the $JURLYN_{1a}$ 402 and the $JURLYN_{1b}$ 403 control all command sequences delivered from the $JURLYN_{Main-1}$ 401 to the Mid-Propulsion 810, Upper-Propulsion 820, and Lower-Propulsion 830 systems.

The $JURLYN_{Main-1}$ 401 controls the MagAcc Mid-Propulsion system 810. The Mid-Propulsion system 810 mounts on both sides of the $JURLYN_{Main-1}$ 401 for midsection forces of magnetic fields and polarity orientation balance and for midpoint reinforcement.

The $JURLYN_{Main-1}$ 401 controls the MagAcc Upper-Propulsion system 820. The Upper-Propulsion system 820 mount on both sides of the $JURLYN_{1a}$ 402. They function together to establish stabilize upper propulsion movements on the train or any load as a retrofit and to maintain the force of magnetic fields and polarity orientation centering for their respective to the position of the JURLYN 402.

The $JURLYN_{Main-1}$ 401 controls the MagAcc Lower-Propulsion system 830. The Lower-Propulsion system 830 mount on both sides of the $JURLYN_{1a}$ 403. They function together to establish stabilize lower propulsion movements on the train or any load as a retrofit and to maintain the force of magnetic fields and polarity orientation centering for their respective to the position of the JURLYN 403.

The $JURLYN_{Main-1}$ 401 controls the Mid-Propulsion 810, Upper-Propulsion 820, and Lower-Propulsion 830 for the MagAcc system braking. The Mid-Propulsion 810, Upper-Propulsion 820, and Lower-Propulsion 830 mounted on both sides of the $JURLYN_{Main-1}$ 401, the $JURLYN_{1a}$ 402 and the $JURLYN_{1b}$ 403, respectively, function together to couple a stable deceleration and braking on the train or any load as a retrofit. Uniformly, the Mid-Propulsion 810, Upper-Propulsion 820, and Lower-Propulsion 830 are given command sequences to shift left and right, thereby, causing the train or any load as a retrofit forces of magnetic fields and polarity orientations emanating from the Mid-Propulsion 810, Upper-Propulsion 820, and Lower-Propulsion 830 to be in sync with the forces of magnetic fields and polarity orientations of their respective LPS series guideways and thereby, changing the direction of propulsion mode and causing a deceleration and braking sensation to occur.

Connecting the JURLYN 401 402 403, to the Mid-Propulsion 810, Upper-Propulsion 820, and Lower-Propulsion 830 are interleaved Propulsion Pump Conduits ($P^2C$). The $P^2C$ connects the $JURLYN_{Main-1}$ to the 700 which carries one or more command lines, symmetrically and asynchronous to their respective JURLYN servo-control system 401 402 403. Each $P^2C$ of this interleaved array, at a given axial location, carries the command, in the same direction, alternating in time, in synchronism with the motion of the object so as to provide continuous undulation for train or any load as a retrofit propulsion, acceleration, deceleration and braking forces as needed.

The Pressure Pump ($P^2$) is the controlling factor for the actions of push and pull for the unit of 725 and the measured distance of the push and pull 750 to establish stable net forces of magnetic fields and primary and inverse polarity orientations ($A_\beta$ and $^-A_\beta$) for rest for a train or any load as a retrofit.

The Pressure Pump ($P^2$) is the controlling factor for the actions of push and pull for the unit of 725 to establish stable net forces of magnetic fields and primary and inverse polarity orientations ($A_\beta$ and $^-A_\beta$) for initial momentum for a train or any load as a retrofit. During a train or any load as a retrofit acceleration continuous pump adjustments are observed to maintain train or any load as a retrofit a stable and continuous acceleration.

The Pressure Pump ($P^2$) is the controlling factor for the actions of push and pull for the unit of 725 to establish stable net forces of magnetic fields and primary and inverse polarity orientations ($A_\beta$ and $^-A_\beta$) for deceleration, slow down and braking for a train or any load as a retrofit. During a train or any load as a retrofit acceleration continuous pump adjustments are observed to maintain train or any load as a retrofit a stable and continuous acceleration.

At rest, $P^2C$ 700 initiates commands to $P^2$ 725, respectively, to perform the functions needed to increase and decrease the length of the pump. This action on the pump enables the gap distance between $P^2$ 725 with their respective LPS100 520 on the LSA400 510 series Strong Side Surface and LPS100 520 on the LSA400 610 series Weak Side Surface to be adjusted to a calculated position between the forces of magnetic fields and polarity orientations for a controlled acceleration. The respective LPS100 520 and the LSA400 510 series on the Strong Side Surface and LPS100 520 and the LSA400 610 series on the Weak Side Surface, respectively; wait for the next command sequence of instructions.

As the command from $P^2C$ 700, respectively, is given to $P^2$ 725 for a train or any load as a retrofit acceleration and deceleration, each side simultaneously synchronizes an increase and reduction to their forces of magnetic fields and polarity orientation gap position on the train or any load as a retrofit, as needed, to a position of stability. To maintain a stable continuous gap distance throughout the acceleration and deceleration mode, $P^2$ 725 movements must be constant and consistently in sync with their adjustments. Once a stable field is established and the train or any load as a retrofit is at an equilibrium, $P^2$ 725 may continually be commanded to initiate movements inward and outward to maintain the position of the train or any load as a retrofit, as needed, to a position of propulsion stability until the train or any load as a retrofit come to a state of rest again.

The new configuration would provide an energy-efficient means for a continuous and uninterrupted propulsion system operating solely by the interactions of forces of magnetic fields and polarity orientations emanating from permanent magnets. The present propulsion system eliminates use of any power off the grid, fuel, or any external power source, because it's propulsion is based on the internal switching functions within the permanent magnets themselves.

During operation, initial momentum and continuous acceleration occurs when the four (4) LPS series are moved perpendicularly into close proximity to the LSA configuration Strong Side Surface along the XZ-plane, respectively. Initial slowdown and braking occur when the four (4) LPS series are moved perpendicularly into close proximity to the LSA configuration Weak Side Surface along the XZ-plane, respectively.

Under such conditions, the eight (8) LPS series independently use their antithetical ends of repel and attract action forces of magnetic fields and polarity orientations against the LSA configuration Strong Side Surface and Weak Side Surface for continuous control for the train or any load as a retrofit to achieve the actions of forward-braking-reverse, respectively.

The new forces of magnetic fields polarity orientations would provide an energy-efficient means stabilized propulsion and braking system for a train or any load as a retrofit. It is environmentally friendly, and thereby, making its pollution level near to zero. The near frictionless forces of magnetic fields and polarity orientations for initial momentum and continuous acceleration lessen the noise reduction and make this the ideal mode for urban transportation. The overall cost from production-to-operation is lesser than any in its field and to maintain its operation is the most cost efficient ever introduced.

These permanent magnet series and configurations are provided to prove that the actions of the attract and repel forces of magnetic fields and polarity orientations can be used to produce initial momentum and a continuous acceleration onto the train or any load as a retrofit. The propulsion system is separated from the lift property of the levitation components, which gives way to the advantage of being able to tailor and control each independent system to function optimally for whatever application is at hand.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

The invention claimed is:

1. A magnet configuration comprising:
    one or more sets of Linear Polarity Switching series having a first force of magnetic fields and polarity orientations wherein the Linear Polarity Switching series has a first series of permanent magnets joined at their points of attraction; and
    one or more sets of London Spinal Assemblage that are magnetically and polarity orientated structurally connected together, respectively, to form magnetic fields of flux having characteristics of attracting and repelling actions between one or more front end connections of the one or more sets of the Linear Polarity Switching series and the London Spinal Assemblage wherein the London Spinal assemblage has three magnetic arrays, wherein each array of the three magnetic arrays has a center permanent magnet with a pole pointing toward the Linear Polarity Switching series and surrounding permanent magnets on either side of the center permanent magnet with poles pointing toward the center permanent magnet.

2. The magnet configuration of claim 1, wherein the one or more sets of the Linear Polarity Switching series are arranged in a seven or more by one formation.

3. The magnet configuration of claim 2, wherein magnet poles of the one or more sets of the Linear Polarity Switching series are pointing in a same direction perpendicularly to the one or more sets of the London Spinal Assemblage.

4. The magnet configuration of claim 3, wherein there are four sets of the Linear Polarity Switching series.

5. A system incorporating the one or more sets of the Linear Polarity Switching series and the one or more sets of the London Spinal Assemblage according to claim 4, wherein the system provides a propulsion force from a fixed position of the one or more sets of the Linear Polarity Switching series wherein the system is symmetrically located with respect to a midplane of the one or more sets of the London Spinal Assemblage.

6. A system incorporating the one or more sets of the Linear Polarity Switching series and the one or more sets of the London Spinal Assemblage according to claim 5, further comprising one or more pressure pumps connected to the one or more sets of the London Spinal Assemblage wherein the one or more pressure pumps are adjustable in length to a distance between the one or more sets of the London Spinal Assemblage and the one or more sets of the Linear Polarity Switching series.

7. A system incorporating the one or more sets of the Linear Polarity Switching series and the one or more sets of the London Spinal Assemblage according to claim 6, further comprising a JURLYN control device wherein the JURLYN control device sends and receives commands to and from one or more structures by one or more conduits carrying one or more command lines wherein the one or more structures receive the commands and adjust accordingly to said commands.

8. A system incorporating the one or more sets of the Linear Polarity Switching series and the one or more sets of the London Spinal Assemblage according to claim 1, wherein a plurality of sets of the one or more sets of the Linear Polarity Switching series and a plurality of sets of the one or more sets of the London Spinal Assemblage are arranged immediately adjacent to each other so as to define a rectangular matrix having rows and columns.

9. A system incorporating an interleaved array of the one or more sets of the Linear Polarity Switching series and the one or more sets of the London Spinal Assemblage according to claim 8, wherein the system provides a propulsion force from a fixed position of the one or more sets of the Linear Polarity Switching series wherein the system is symmetrically located with respect to a midplane of the one or more sets of the London Spinal Assemblage.

10. A system incorporating the interleaved array of the one or more sets of the Linear Polarity Switching series and the one or more sets of the London Spinal Assemblage according to claim 9, further comprising one or more pressure pumps connected to the one or more sets of the London Spinal Assemblage wherein the one or more pressure pumps are adjustable in length to a distance between the one or more sets of the London Spinal Assemblage and the one or more sets of the Linear Polarity Switching series.

11. A system incorporating the interleaved array of the one or more sets of the Linear Polarity Switching series and the one or more sets of the London Spinal Assemblage according to claim 10, further comprising a JURLYN control device wherein the JURLYN control device sends and receives commands to and from one or more structures by one or more conduits carrying one or more command lines wherein the one or more structures receive the commands and adjust accordingly to said commands.

12. A plurality of magnet configurations wherein each magnet configuration comprises:
a plurality of Linear Polarity Switching series having a first force of magnetic fields and polarity orientations and a plurality of London Spinal Assemblage are magnetically and polarity oriented structurally connected together to form a first pair of forces of magnetic fields and polarity orientations of flux having characteristics of repulsion and attractions between interactions of the Linear Polarity Switching series without drop edges on one or more waves, wherein the London Spinal Assemblage are fixed so as to define a rectangular matrix having antithetical actions of forces of magnetic fields and primary polarity orientations at one end and forces of magnetic fields and inverse polarity orientations at its other end, wherein the Linear Polarity Switching series has a first series of permanent magnets joined at their points of attraction, wherein the London Spinal assemblage has three magnetic arrays, wherein each array of the three magnetic arrays has a center permanent magnet with a pole pointing toward the Linear Polarity Switching series and surrounding permanent magnets on either side of the center permanent magnet with poles pointing toward the center permanent magnet wherein a center array of the three arrays is positioned behind two outer arrays of the three arrays such that one of the surrounding permanent magnets of the center array is behind one of the surrounding permanent magnets of the outer arrays.

13. The plurality of magnet configurations of claim 12, wherein the Linear Polarity Switching series is arranged in a seven or more by one formation.

14. The plurality of magnet configurations of claim 13, wherein magnet poles of the plurality of the Linear Polarity Switching series are pointing in a same direction perpendicularly to the plurality of the London Spinal Assemblage.

15. The plurality of magnet configurations of claim 14, wherein there are Linear Polarity Switching series.

16. A system incorporating the plurality of magnet configurations according to claim 12, wherein the system provides a propulsion force from a fixed position of the plurality of the Linear Polarity Switching series wherein the system is symmetrically located with respect to a midplane of the plurality of the London Spinal Assemblage.

17. A system incorporating an interleaved array of the plurality of magnet configurations according to claim 12, further comprising one or more pressure pumps connected to the plurality of the London Spinal Assemblage wherein the one or more pressure pumps adjustable in length to a distance between the plurality of the London Spinal Assemblage and the plurality of the Linear Polarity Switching series.

18. A system incorporating the plurality of magnet configurations of claim 12, further comprising a JURLYN control device wherein the JURLYN control device sends and receives commands to and from one or more structures by one or more conduits carrying one or more command lines wherein the one or more structures receive the commands and adjust accordingly to said commands.

* * * * *